(12) United States Patent
Robin

(10) Patent No.: US 9,621,195 B2
(45) Date of Patent: Apr. 11, 2017

(54) FREQUENCY BAND SWITCHING RADIO FRONT END

(71) Applicant: CASSIDIAN SAS, Elancourt (FR)

(72) Inventor: Michel Robin, Marly-le-Roi (FR)

(73) Assignee: AIRBUS DS SAS, Elancourt (FR)

( * ) Notice: Subject to any disclaimer, the term of this patent is extended or adjusted under 35 U.S.C. 154(b) by 3 days.

(21) Appl. No.: 14/359,773

(22) PCT Filed: Nov. 21, 2012

(86) PCT No.: PCT/EP2012/004821
§ 371 (c)(1),
(2) Date: May 21, 2014

(87) PCT Pub. No.: WO2013/075824
PCT Pub. Date: May 30, 2013

(65) Prior Publication Data
US 2014/0321340 A1    Oct. 30, 2014

(30) Foreign Application Priority Data

Nov. 22, 2011  (FR) ..................................... 11 03553

(51) Int. Cl.
*H04B 1/00*  (2006.01)
*H04B 1/50*  (2006.01)
(Continued)

(52) U.S. Cl.
CPC ......... *H04B 1/0064* (2013.01); *G08G 5/0069* (2013.01); *H04B 1/50* (2013.01); *H04W 88/04* (2013.01)

(58) Field of Classification Search
None
See application file for complete search history.

(56) References Cited

U.S. PATENT DOCUMENTS

| 6,690,657 B1 | 2/2004 | Lau et al. | |
| 2002/0090974 A1* | 7/2002 | Hagn | H04B 1/005 455/552.1 |
| 2011/0136446 A1* | 6/2011 | Komninakis | H04B 7/0691 455/78 |

FOREIGN PATENT DOCUMENTS

| DE | 102004039674 | 11/2005 |
| JP | 64-71222 | 3/1989 |
| WO | 2010/002100 | 1/2010 |

OTHER PUBLICATIONS

International Search Report for Int. App. No. PCT/EP2012/004821, completed Mar. 11, 2013.

* cited by examiner

*Primary Examiner* — Kouroush Mohebbi
(74) *Attorney, Agent, or Firm* — Pillsbury Winthrop Shaw Pittman LLP

(57) ABSTRACT

A full duplex microwave front end (300, 400, 500, 600, 800) for the communication system of an unmanned aerial vehicle such as a drone, comprising: —a transmitter module (310, 410, 510, 610, 710, 810) capable of selecting an antenna (311, 312, 411, 412, 511, 512, 611, 612, 711, 712), the most appropriate one at a given time, in order to emit and/or receive a signal, —a filter module (320, 420, 520, 620, 720, 820), capable of insulating the emission function from the reception function in order to emit the signal or insulating the reception function from the emission function in order to receive the signal, and —an amplifier module (340, 440, 540, 640, 740, 840), capable of amplifying the weak signal received in order to demodulate it, or capable of amplifying the power of the modulated signal intended to be emitted, characterized in that it comprises, —a switch module (330, 430, 530, 630, 730, 830) capable of switching the (Continued)

frequency bands B1 and B2 used for emitting and receiving the said signal respectively.

16 Claims, 15 Drawing Sheets

(51) Int. Cl.
*G08G 5/00* (2006.01)
*H04W 88/04* (2009.01)

FREQUENCY BAND SWITCHING RADIO FRONT END

AREA OF THE INVENTION

This invention relates to a frequency band switching microwave front end that allows full-duplex. type communication links. More particularly, the purpose of the invention is to propose a radio front end system that makes it possible to control a UAV (Unmanned Aerial Vehicle), generally called a drone, remotely when the communication link between the ground and the UAV is not within the line of sight.

STATE OF THE ART AND TECHNICAL PROBLEMS ENCOUNTERED

In the state of the art, a radiofrequency communication system may be broken down into two main subassemblies:
  a front end 100 and
  a modem.

That breakdown of the radiofrequency communication system is generally, in microwave systems, a physical separation between the emission/reception function and the modulation/demodulation function. Indeed, the front end 100 is placed as close as possible to an antenna 111, in order to minimise loss and thus maximise signal emission and reception performance. A front end 100 of a full duplex type communication system, or in other words, where the information or data are transported simultaneously in each direction, mainly comprises the following as illustrated in FIG. 1:
  an LNA (Low Noise Amplifier) 141
  an HPA (High Power Amplifier) 142, and
  a duplexer 123.

The front end 100 further comprises filters 121 and 122 which insulate the receiver R from the emitter T. Emission takes place in a frequency band B2 and reception takes place in a frequency band B1.

The use of such a front end 100 for the full duplex communication system of an unmanned aerial vehicle or UAV or drone makes it possible to control the said drone by radio from the ground. Further, such use makes it possible to receive remote measurements and data from the sensors on board the said drone.

In view of the size and altitude of the drone, it may be useful to install two antennas, 211 and 212 respectively, on board the drone as illustrated in FIG. 2 to make it possible to select the most appropriate one at a given time during the mission. In such a case, an antenna switch 213 is coupled at the input of the front end 200. That switch 213 is controlled by a control unit C1.

However, the range of the communication link between the ground and the drone within the line of sight is limited, particularly due to the curvature of the earth.

That is why there is a need to increase the range of the communication link between the ground and the drone when they are not radio linked within the line of sight.

DESCRIPTION OF THE INVENTION

This invention aims to remedy all the drawbacks of the state of the art. To do so, the invention offers a number of full duplex front-end architectures. The type of front-end architecture according to the invention makes it possible to increase the range of the communication link by inserting a second drone with a front end according to the invention in the path between the drone supervision means and the said drone. Thus, the use of the front end according to the invention makes it possible to switch the emission and reception bands of the second drone, allowing it to become a relay drone. In other words, switching the emission and reception bands makes it possible to obtain emission in the frequency band B1 and reception in the frequency band B2.

The invention thus covers a full duplex microwave front end for the communication system of an unmanned aerial vehicle such as a drone, comprising:
  a transmitter module capable of selecting an antenna, the most appropriate one at a given time, in order to emit and/or receive a signal,
  a filter module capable of insulating the emission function from the reception function in order to emit the signal or insulating the reception function from the emission function in order to receive the signal, and
  an amplifier module capable of amplifying the weak signal received in order to demodulate it, or capable of amplifying the power of the modulated signal intended to be emitted,
characterised in that it comprises,
  a switch module capable of switching the frequency bands B1 and B2 used respectively for emitting and receiving the said signal.

The invention also comprises any of the following characteristics:
  the amplifier module comprises:
    at least one amplifier capable of amplifying the signal received so as to be demodulated by a modem,
    an amplifier capable of amplifying the power of the signal modulated by the said modem so as to be emitted;
  the transmitter module comprises at least one switch configured to select the antenna which is the most appropriate at a given time;
  the filter module comprises:
    a filter that insulates the signal on the frequency band B1,
    a filter that insulates the signal on the frequency band B2,
    the said two filters being connected to the transmitter module by means of a duplexer and connected to the amplifier module by means of the switch module;
  the switch module comprises at least one switch configured to:
    couple certain amplifiers with certain filters when the front end is in a mode for setting up a direct communication link,
    couple certain amplifiers with certain filters when the front end is in a mode for setting up a relayed communication link;
  the switch module comprises four switches configured so that the said switches are capable of switching, together and synchronously;
  the filter module comprises two branches, each comprising:
    a filter that insulates the signal on the frequency band B1,
    a filter that insulates the signal on the frequency band B2,
    the branches being each connected to the transmitter module by means of a duplexer and connected to the amplifier module by means of the switch module;
  the switch module comprises two switches configured,
    to couple certain amplifiers with certain filters when the front end is in a mode for setting up a direct communication link, to couple certain amplifiers with certain filters when the front end is in a mode for setting up a relayed communication link;

the switch module comprises a duplexer and a switch configured,
- to couple certain amplifiers with certain filters when the front end is in a mode for setting up a direct communication link,
- to couple certain amplifiers with certain filters when the front end is in a mode for setting up a relayed communication link;

the switch module comprises two switches capable of selecting the two antennas at the same time so that,
- when certain amplifiers are coupled with certain filters, the front end is configured to be in a self-test mode in the frequency band B1,
- when certain amplifiers are coupled with certain filters, the front end is configured to be in a self-test mode in the frequency band B2;

the switch is configured so as to be able to couple the modem with:
- either the amplifier connected to the filter insulating the reception circuit on the frequency band B1, or
- the amplifier connected to the filter insulating the reception circuit on the frequency band B2.

BRIEF DESCRIPTION OF FIGURES

The invention will become easier to understand in the description below and the figures accompanying it. The figures are presented for illustration only and are not limitative in any way. The figures illustrate the following.

DESCRIPTION OF THE INVENTION

Figure 1:
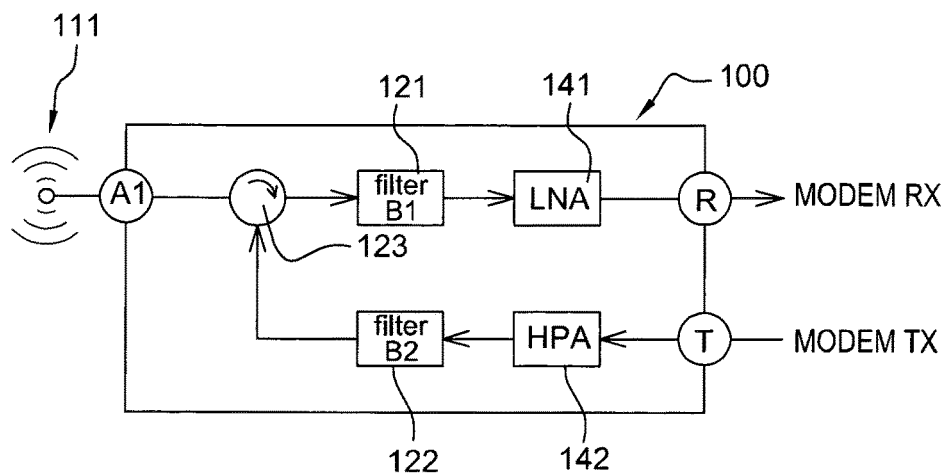
FIG. 1: a schematic representation of a full duplex front-end architecture according to the state of the art, described above.
Figure 2:
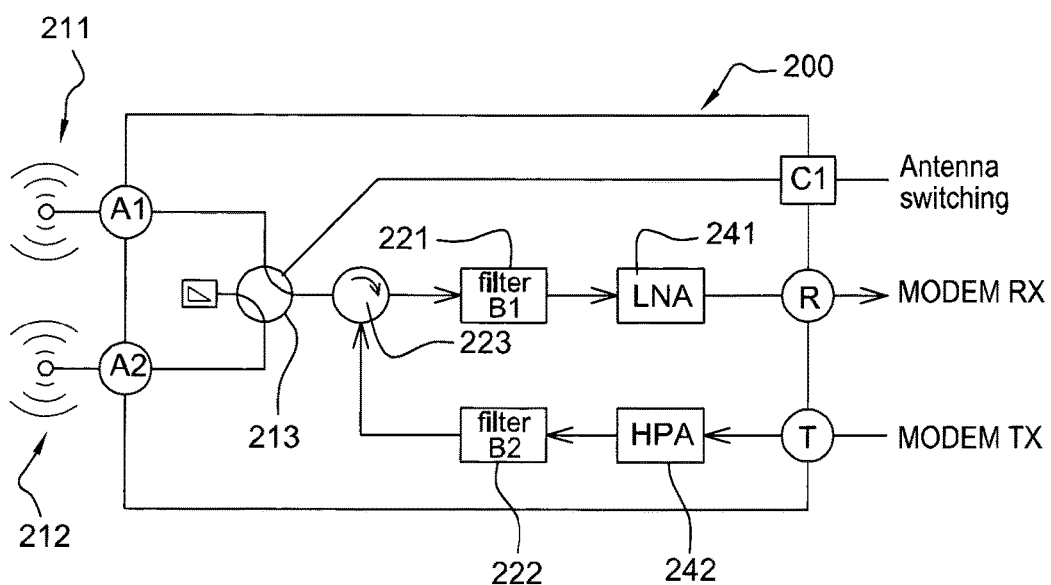
FIG. 2: a schematic representation of an antenna switching full duplex front-end architecture according to the state of the art, described above.

It must be noted that the figures are not to scale.

The following embodiments are examples. Even though the description refers to one or more embodiments, that does not necessarily mean that each reference relates to the same embodiment or that the characteristics apply to only one embodiment. Simple characteristics of the different embodiments can also be combined to supply other embodiments.

Unmanned Aerial Vehicles or UAVs, which will be called drones below, generally have a communication system. The primary function of the communication system of a drone is to make it possible to control the said drone via supervision and control means from a military or other complex installed on the ground or underground, but also from an aircraft, a mobile vehicle on the ground, a ship, a submarine or a space shuttle. The secondary function of the communication system is to allow the transmission, via the supervision means, of remote measurements and data from the sensors on board the said drone.

To that end, the communication system used is of the microwave type, in that it comprises the following elements on a non-comprehensive basis:
- a radio system designed to emit or pick up electromagnetic waves, called antenna in the description below. In view of the size and altitude of the drone, it may be useful to install two antennas on board the drone to make it possible to select the antenna that is most appropriate for transmitting or receiving data at a given time during the mission.
- a front end, which allows full duplex bidirectional communication. Full duplex means that information or data are transported simultaneously in each direction, or in emission and reception.
- a modem, where the modulator makes it possible to convert the digital data from the sensors on the drone into a signal that can be emitted by the antenna and the demodulator makes it possible to convert the signal received by the antenna into digital data which may for example make it possible to fly the drone or remotely reconfigure one or more sensors.

However, the range of the microwave communication link between the supervision means and the drone within the line of sight remains very limited, particularly due to the curvature of the earth.

To increase the range of the radio link between the supervision means and the drone, particularly when the said drone is not in a configuration where the radio link is within the line of sight, it becomes necessary to insert at least a second drone with an appropriate front end according to the invention between the drone supervision means and the said drone.

Indeed, the invention is located in the internal architecture of the front end that is fitted on each drone or at least the drones used as relays for communication up to the supervision means.

According to one embodiment of the invention, an internal front end 300, 400, 500, 600, 700, 800 architecture comprises, in a non-exhaustive manner, a transmitter module 310, 410, 510, 610, 710, 810 capable of selecting an antenna 311, 312, 411, 412, 511, 512, 611, 612, 711, 712, 811, 812 that is the most appropriate at a given time for emitting and/or receiving a signal.

The front end 300, 400, 500, 600, 700, 800 also comprises a filter module 320, 420, 520, 620, 720, 820, capable of insulating the emission function from the reception function in order to emit the signal or insulate the reception function from the emission function in order to receive the signal. It further comprises an amplifier module 340, 440, 540, 640, 740, 840 capable of amplifying the weak signal received earlier by one of the antennas 311, 312, 411, 412, 511, 512, 611, 612, 711, 712, 811, 812 in order to be demodulated, or capable of amplifying the power of the signal modulated earlier by the modem (not shown) and intended to be emitted. The invention is particularly characterised by the fact that the front end 300, 400, 500, 600, 700, 800 comprises a switch module 330, 430, 530, 630, 730, 830. Indeed, the switch module 330, 430, 530, 630, 730, 830 is capable of switching the frequency bands B1 and B2 used respectively for emitting and receiving the said signal.

For its part, the amplifier module 340, 440, 540, 640, 740, 840 comprises at least one amplifier 341, 441, 541, 641, 741, 841a, 841b capable of amplifying the received signal so that it may be demodulated by the modem. On a preferential basis, the amplifier 341, 441, 541, 641, 741, 841a, 841b is an LNA (Low Noise Amplifier). The amplifier module 340, 440, 540, 640, 740, 840 also comprises one amplifier 342, 442, 542, 642, 742, 842 capable of amplifying the power of the signal modulated by the modem so that it can be emitted. On a preferential basis, that amplifier 342, 442, 642, 742, 842 is an HPA (High Power Amplifier).

In one alternative embodiment of the invention, the transmitter module 310, 410, 510, 610 comprises one single switch 313, 413, 513, 613 as illustrated in FIGS. 3 to 6.

Figure 7A:
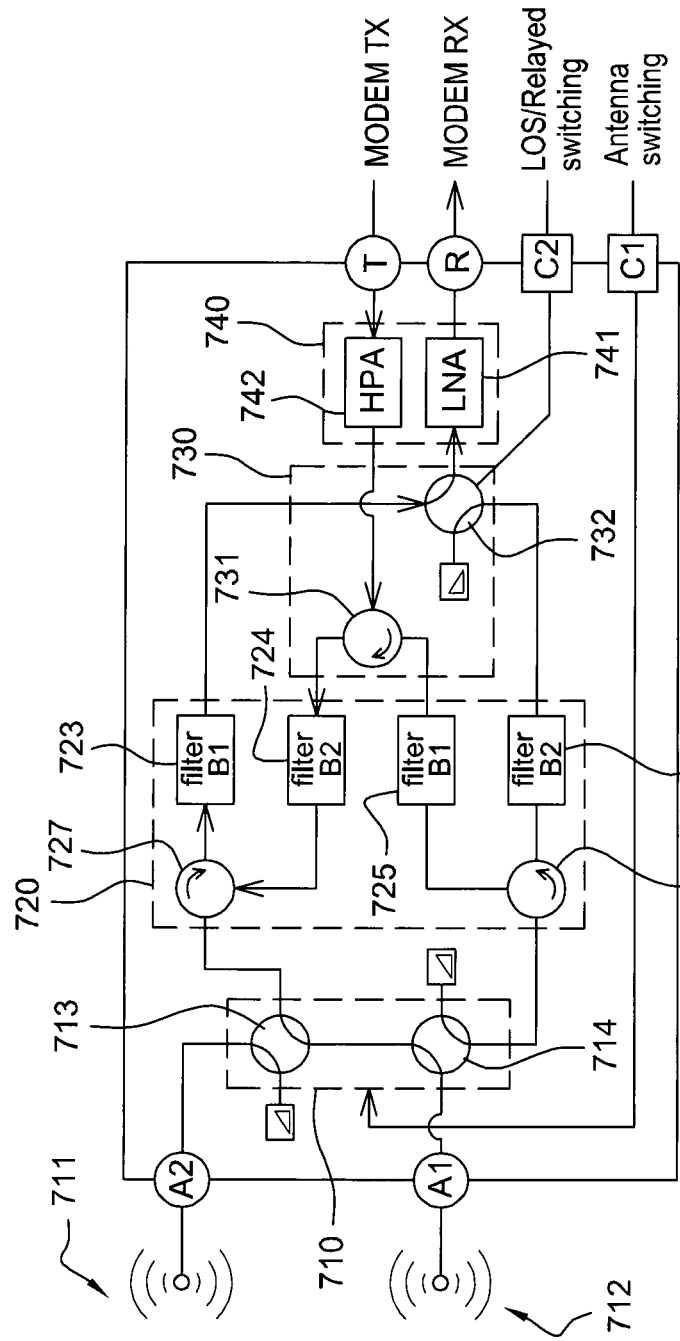
FIGS. 7a-7e: schematic representations of a front-end architecture according to a fifth alternative embodiment of the invention.
Figure 7B:
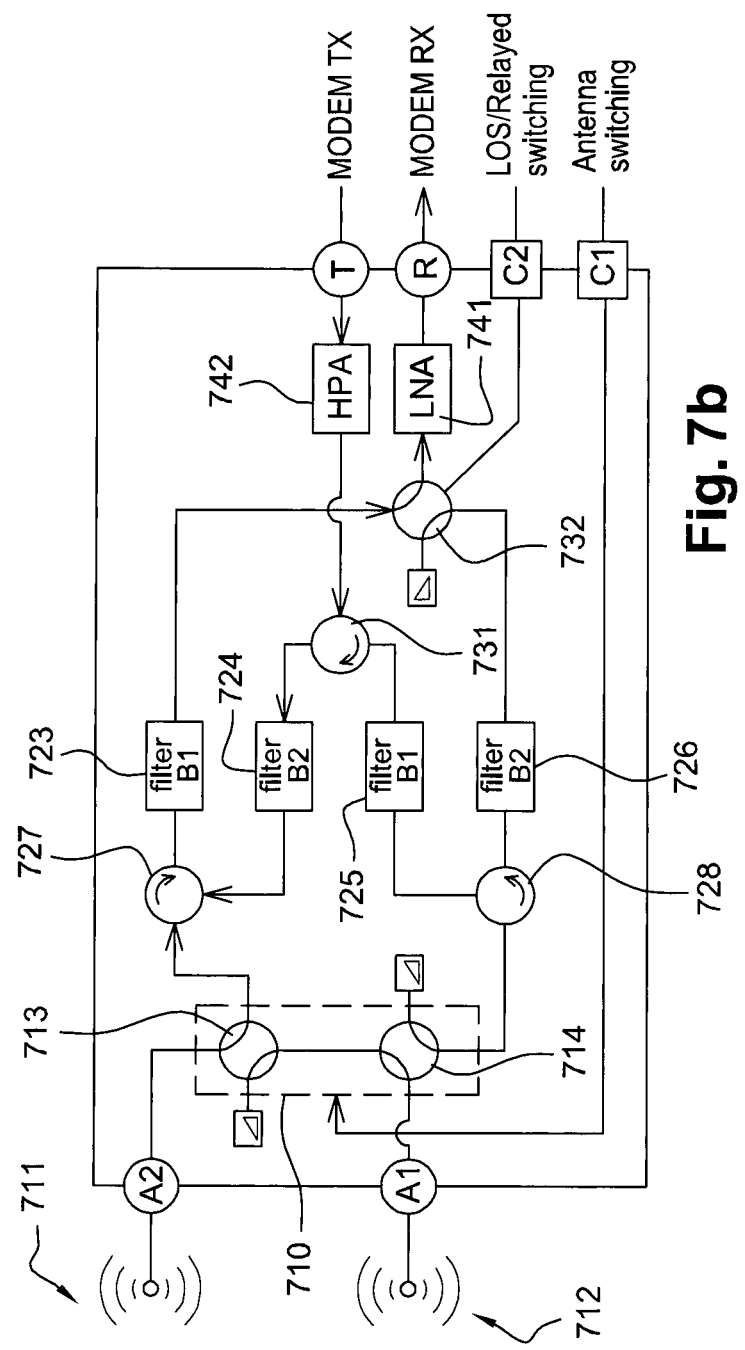
Figure 7C:
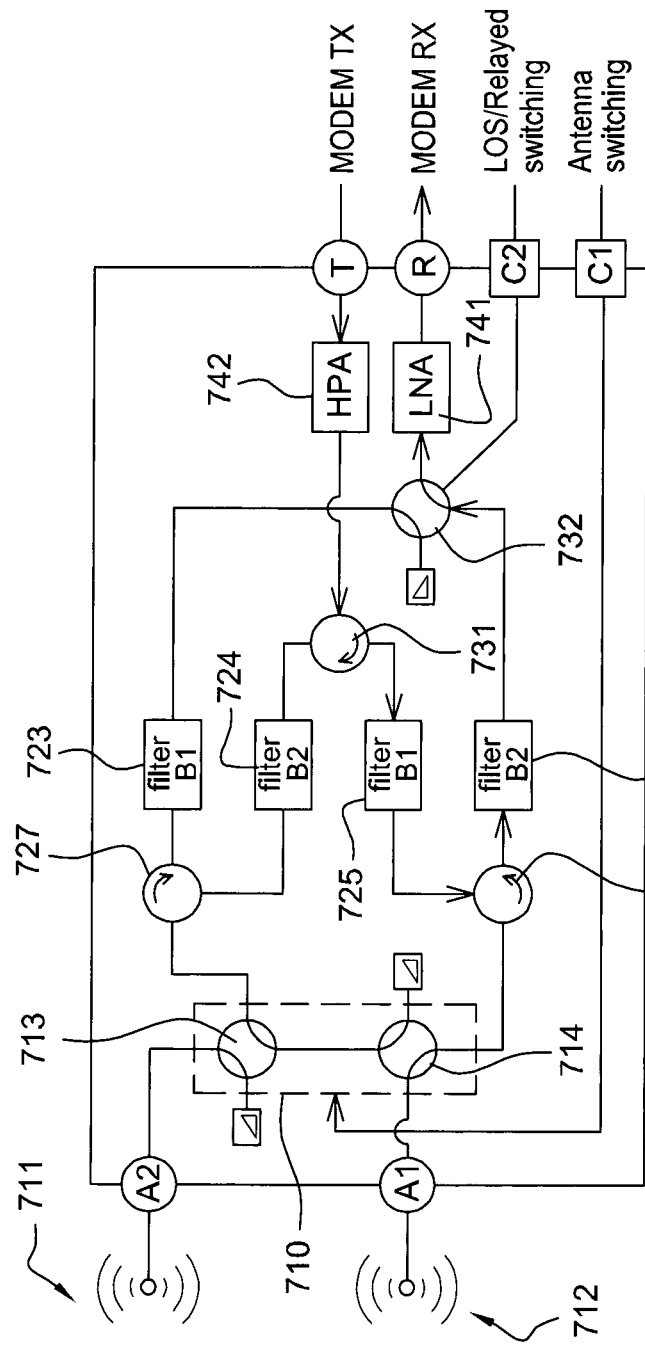
Figure 7D:
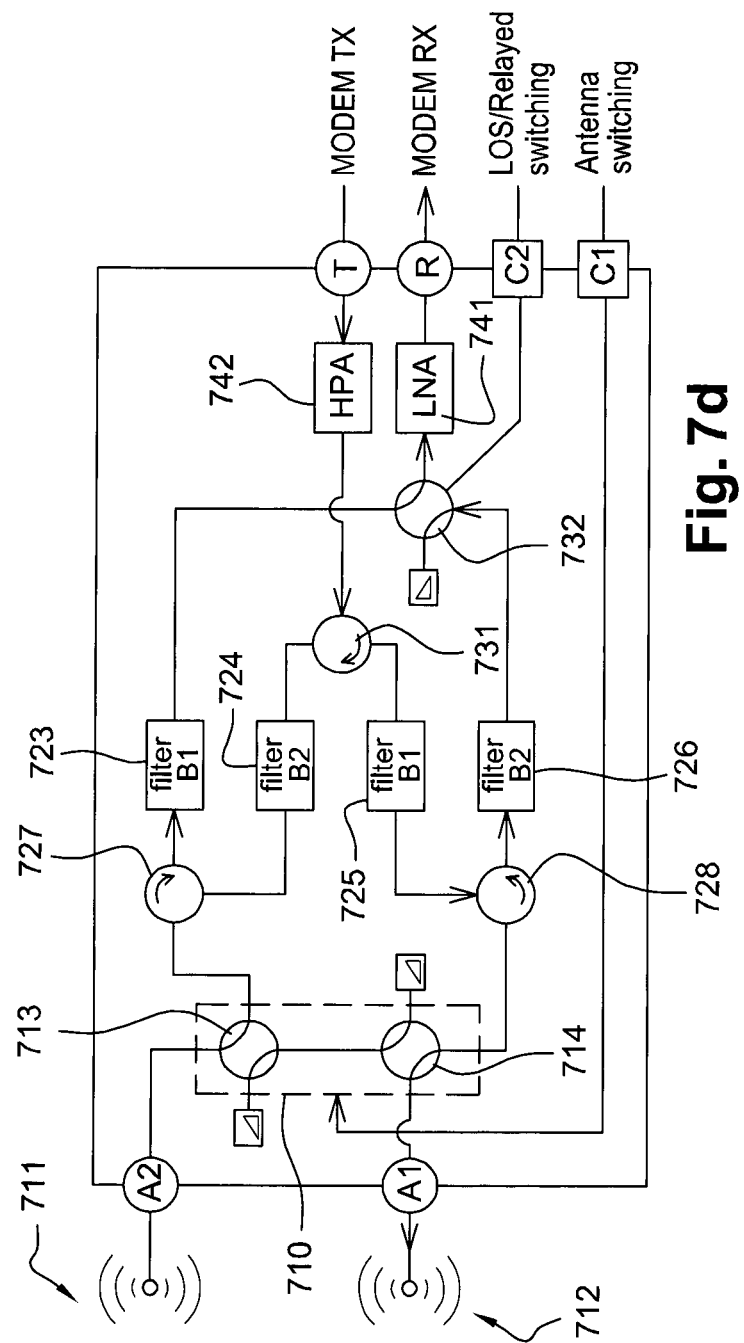
Figure 7E:
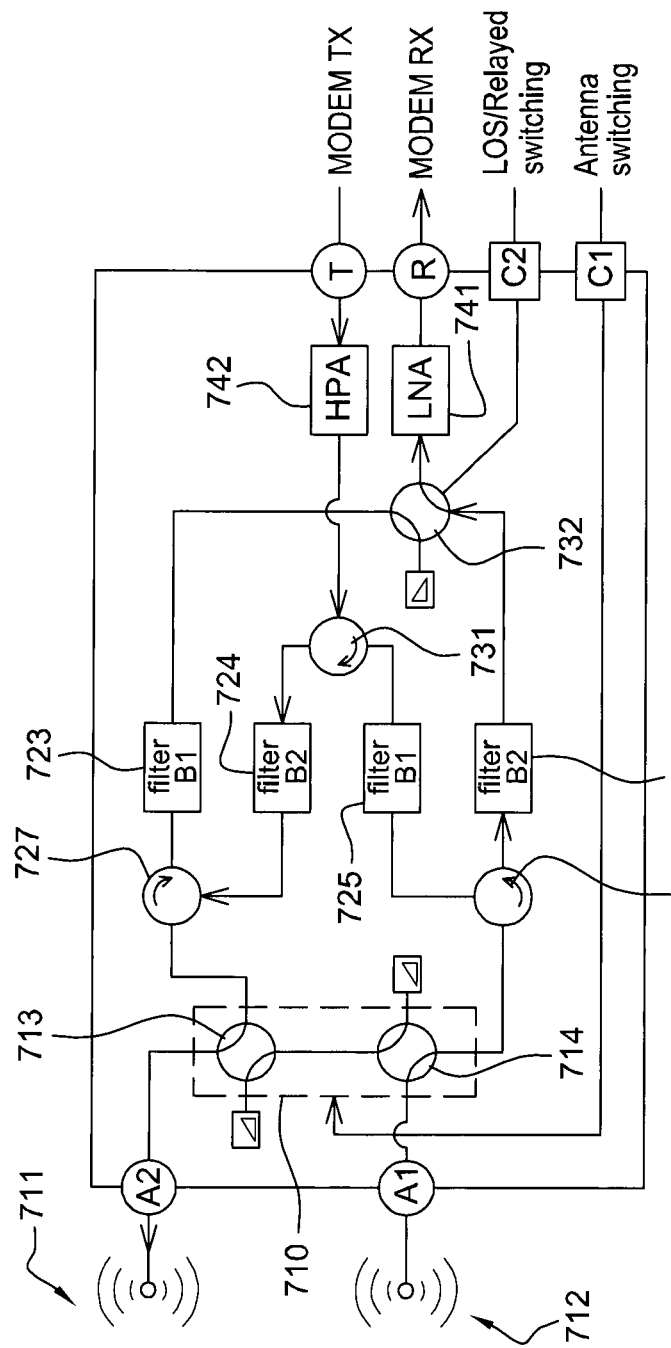
Figure 8:
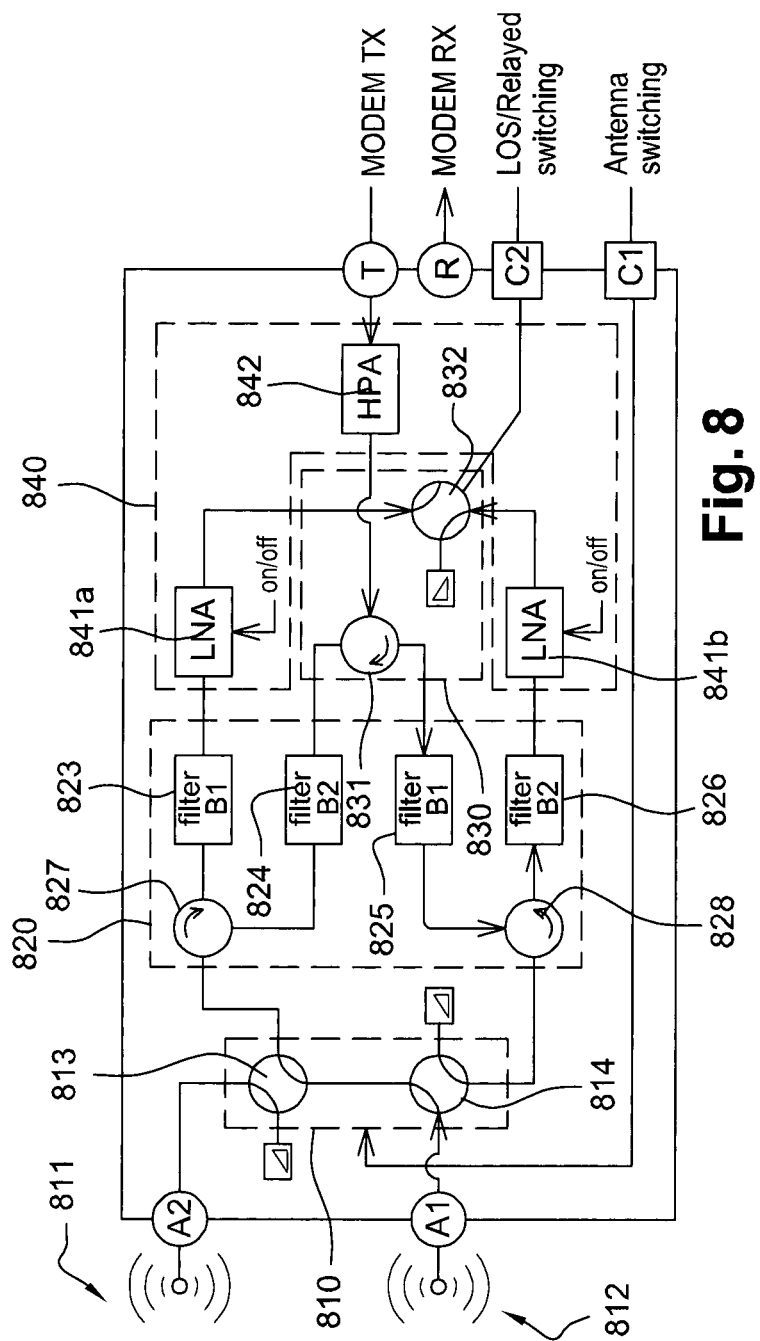
FIG. 8: schematic representation of a front-end architecture according to a sixth alternative embodiment of the invention.

In another alternative embodiment of the invention, the transmitter module 710, 810 comprises two switches 713, 714 and 813, 814 respectively as illustrated in FIGS. 7a to 8.

In each of the two aforementioned alternatives, the switches are configured to select the antenna 311, 312, 411, 412, 511, 512, 611, 612, 711, 712, 811, 812 that is the most appropriate for emitting or receiving a signal at a given time.

In one embodiment of the invention, the filter module 320, 420 comprises, as illustrated in FIGS. 3a to 4b, a filter 321, 421 capable of insulating the signal on the frequency band B1, and a filter 322, 422 capable of insulating the signal on the frequency band B2. The two filters, 321, 322 and 421, 422 respectively, are connected to the transmitter modules 310, 410 by means of a duplexer 323, 423 and are connected to the amplifier modules 340, 440 by means of the switch module 330, 430.

In a first alternative, the switch module 330 comprises a single switch 331. The switch 331 is configured to set up a direct communication link (FIG. 3a) between the supervision means and the drone to be flown. To that end, the switch 331 couples the amplifier 341 with the filter 321 and the amplifier 342 with the filter 322. In that case, the signal is emitted in the frequency band B2 and the signal is received in the frequency band B1. The switch 331 is also configured to set up a so-called relayed communication link (FIG. 3b), meaning that the link between the supervision means and the drone to be flown is made through at least one relay drone. To that end, the switch 331 couples the amplifier 341 with the filter 322 and the amplifier 342 with the filter 321. In that case, the signal is emitted in the frequency band B1 and the signal is received in the frequency band B2.

The switches used are generally components that can process microwave signals ranging from 1 GHz to over 100 GHz, such as for example, electromechanical switches, semiconductor switches (such as diodes or field-effect transistors etc.) or electromechanical microsystems called MEMS (MicroElectroMechanical Systems). Each type of switch has its benefits and drawbacks.

As regards electromechanical switches, their insulation is very good, between 50 and 70 dB depending on the frequency; insertion losses are low, signal power strength remains high, switching time is relatively high, around 10 ms, but the reliability of such switches is limited and they are large.

As regards semiconductor switches, their insulation is fairly medium; insertion losses are also medium, power strength is relatively low, and switching time is around 10 µs, but these switches are reliable and relatively small.

As regards electromechanical microsystems, their insulation is medium; insertion losses are also medium, power strength is low, the size is small and switching time is also small, but the technology is too recent for its characteristics in the medium and long term to be known.

Figure 4A:
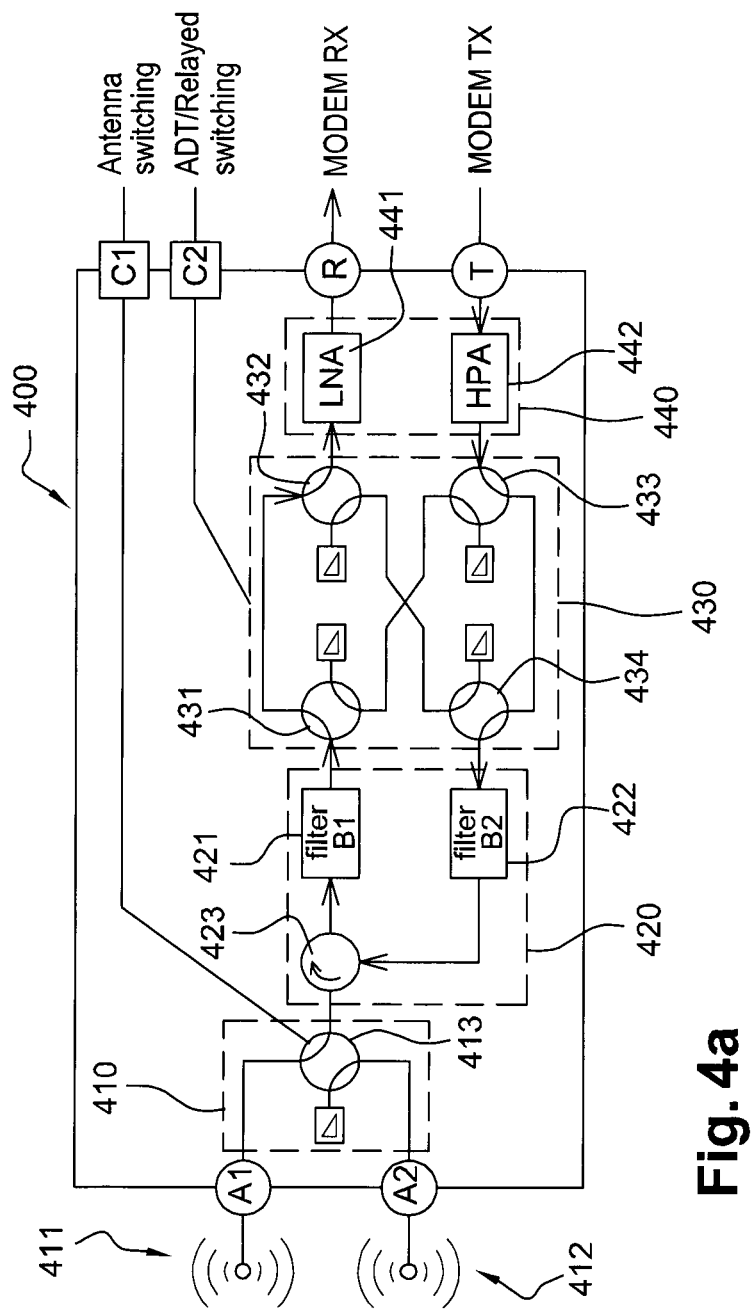
FIGS. 4a-4b: schematic representations of a front-end architecture according to a second alternative embodiment of the invention.
Figure 4B:
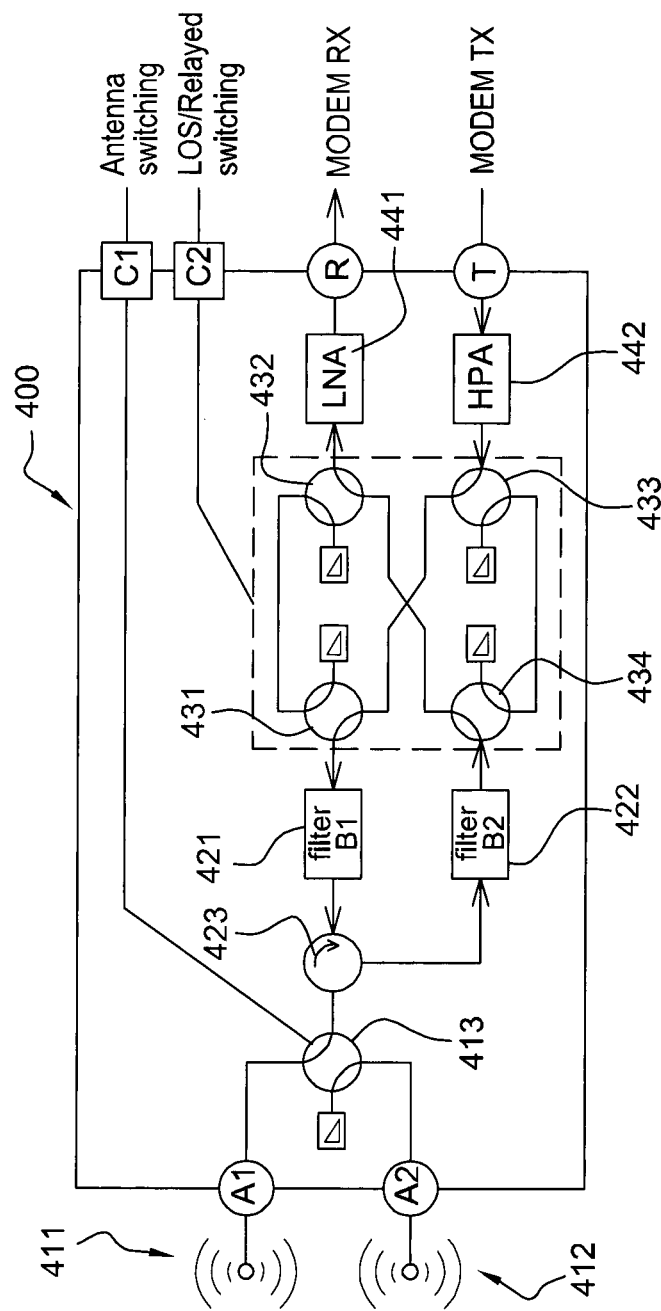

In a second alternative according to FIGS. 4a, 4b, the switch module 430 comprises four power switches 431, 432, 433, 434. These switches 431, 432, 433, 434 are configured so as to set up a direct communication link (FIG. 4a). To that end, the switches 431 and 432 couple the amplifier 441 with the filter 421 and the switches 433 and 434 couple the amplifier 442 with the filter 422. In that case, the signal is emitted in the frequency band B2 and the signal is received in the frequency band B1. These switches 431, 432, 433, 434 are also configured so as to set up a relayed communication link (FIG. 4b). To that end, the switches 431 and 433 couple the amplifier 442 with the filter 421 and the switches 432 and 434 couple the amplifier 441 with the filter 422. In that case, the signal is emitted in the frequency band B1 and the signal is received in the frequency band B2.

The architecture in FIGS. 4a and 4b makes it possible to add together the insulations of the two switches and improve insulation between emission and reception. Indeed, the insulation doubles in value compared to the architecture in FIGS. 3a and 3b. For example, the resulting insulation is 100 dB with switches of 50 dB each.

Figure 3A:
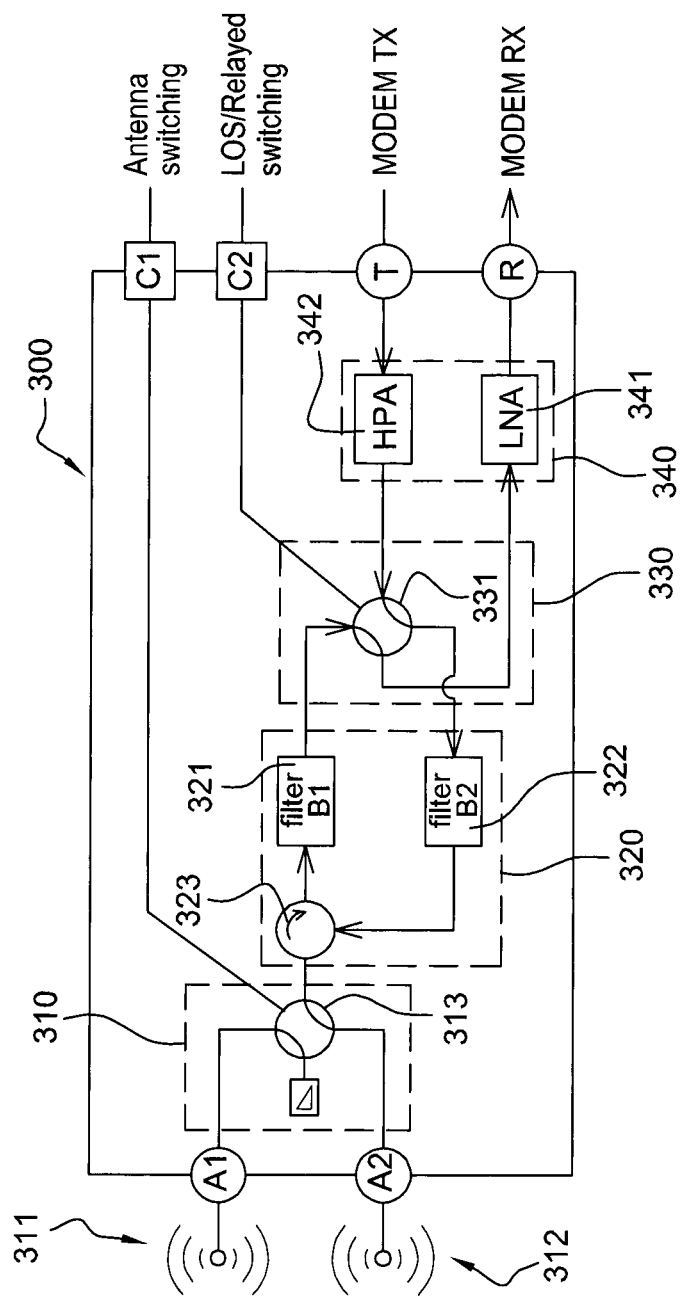
FIGS. 3a-3b: schematic representations of a front-end architecture according to a first alternative embodiment of the invention.
Figure 3B:
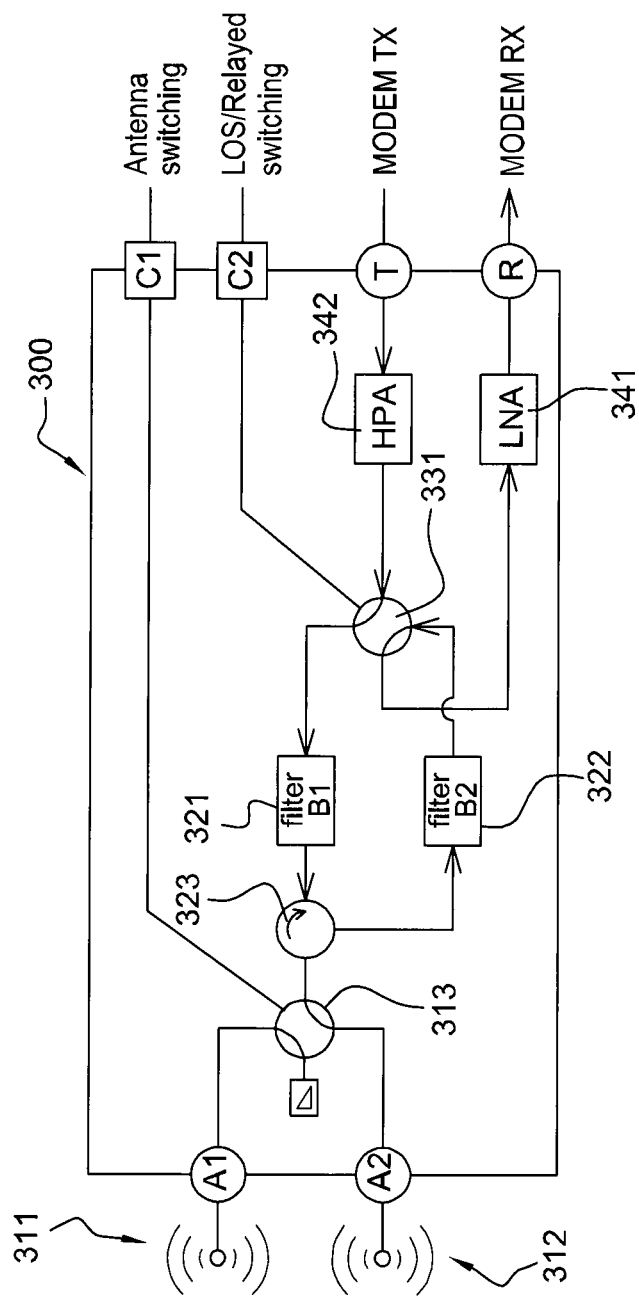

It is thus absolutely necessary that the switches 431, 432, 433 and 434 switch simultaneously and synchronously in order to obtain a high-quality signal with as little degradation compared to an architecture with a single switch as in FIGS. 3a and 3b.

In another embodiment of the invention, the filter module 520, 620, 720, 820 comprises two parts or branches 521, 522, 621, 622, 721, 722, 821, 822 as illustrated in FIGS. 5a to 8. Each of these branches comprises a filter 523, 524, 623, 624, 723, 724, 823, 824 capable of insulating the signal on the frequency band B1 and a filter 525, 526, 625, 626, 725, 726, 825, 826 capable of insulating the signal on the frequency band B2.

The two filters 523, 524, 525, 526, 623, 624, 625, 626, 723, 724, 725, 726, 823, 824, 825, 826 of each branch 521, 522, 621, 622, 721, 722, 821, 822, are connected each to the transmitter module 510, 610, 710, 810 by means of a duplexer 527, 528, 627, 628, 727, 728, 827, 828 and are also connected to the amplifier module 540, 640, 740, 840 by means of the switch module 530, 630, 730, 830.

In the invention, the duplexer 527, 528, 627, 628, 727, 728, 827, 828 is an electronic device that makes it possible to use the same antenna A1 or A2 for emitting and receiving the signal. It is therefore a switch that alternatively links A1 or A2 to the radio emitter, and then to the radio receiver.

Figure 5A:
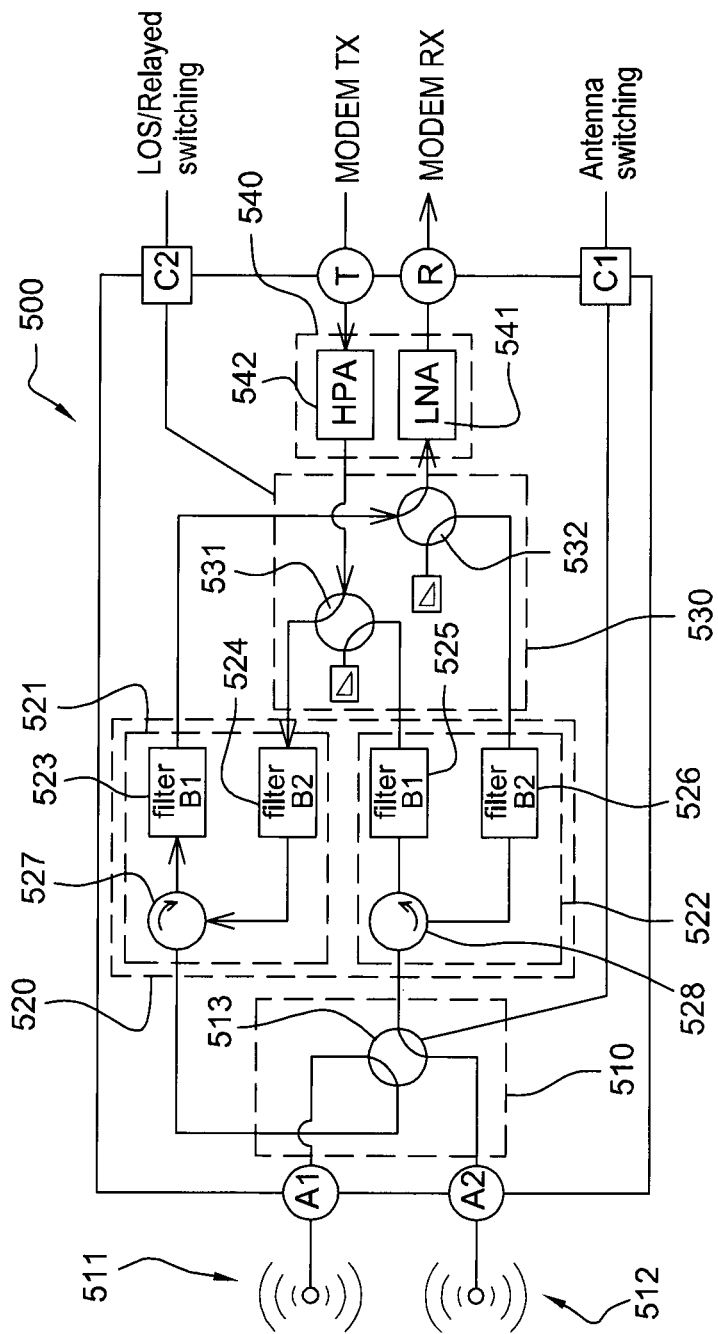
FIGS. 5a-5b: schematic representations of a front-end architecture according to a third alternative embodiment of the invention.
Figure 5B:
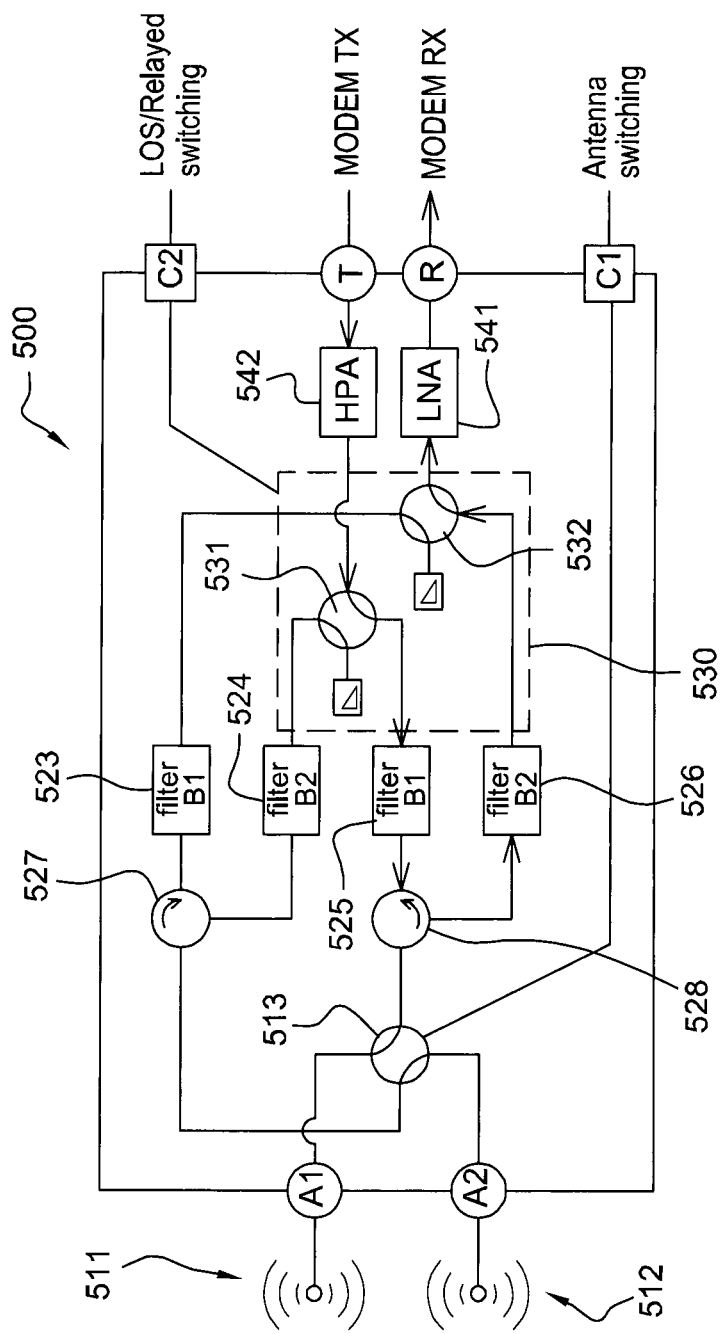

In a first alternative, the switch module 530 comprises two switches 531 and 532. These switches 531 and 532 are capable of setting up a direct communication link (FIG. 5a). To that end, the switch 531 couples the amplifier 542 with the filter 524 and the switch 532 couples the amplifier 541 with the filter 523. In that case, the signal is emitted in the frequency band B2 and the signal is received in the frequency band B1. The switches 531 and 532 are also capable of setting up a relayed communication link (FIG. 5b). To that end, the switch 531 couples the amplifier 542 with the filter 525 and the switch 532 couples the amplifier 541 with the filter 526. In that case, the signal is emitted in the frequency band B1 and the signal is received in the frequency band B2.

The architecture in FIGS. 5a and 5b allows the use of three switches 513, 531 and 532 instead of four switches 431, 432, 433, 434 as illustrated in FIGS. 4a and 4b. The resulting insulation of the switches 513, 531, 532 makes it possible to improve the insulation between the signal emission circuit and the signal emission circuit. As an alternative, the reception circuit switch is a low-power switch. The switches 513 and 532 must be highly insulated and the switches 513 and 531 must have high power strength. As an alternative, the switch 531 has low insulation. Insertion losses are minimised and are similar to those with the device in FIGS. 3a and 3b and the added components are passive. In the invention, an insertion loss is the dissipation of the signal transported for emission or reception because of the implementation of an electronic component such as a switch in the architecture.

Figure 6A:
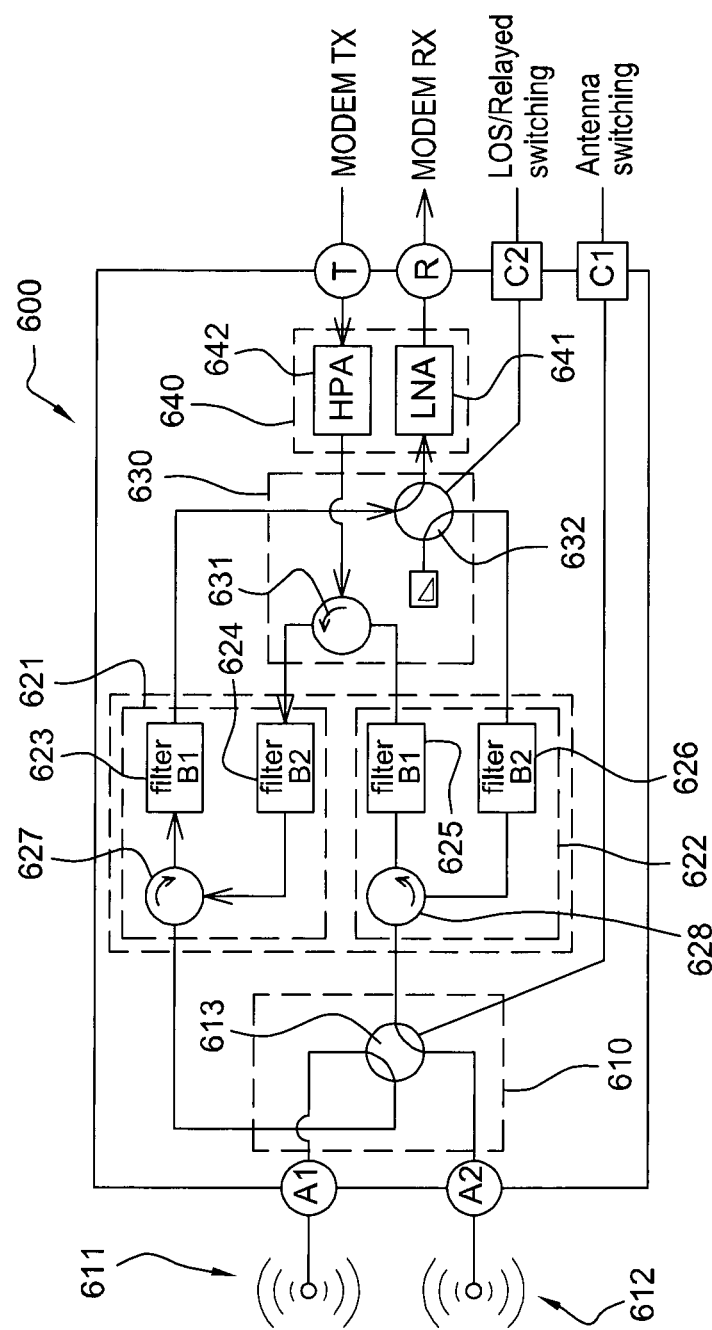
FIGS. 6a-6b: schematic representations of a front-end architecture according to a fourth alternative embodiment of the invention.
Figure 6B:
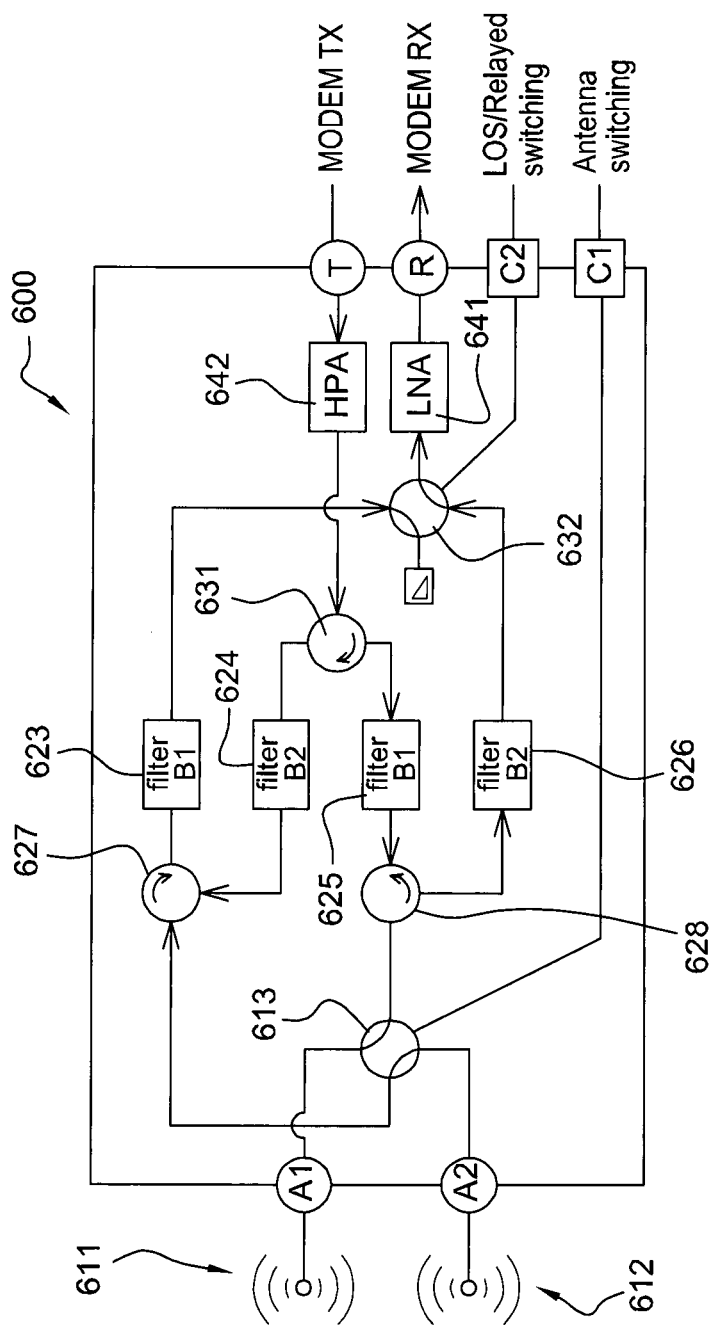

In a second alternative derived from the architecture in FIGS. 5a and 5b, the switch module 630 comprises a switch 632 and a circulator or duplexer 631. The switch 632 and the duplexer 631 are capable of setting up a direct communication link (FIG. 6a). To that end, the duplexer 631 couples the amplifier 642 with the filter 624 and the switch 632 couples the amplifier 641 with the filter 623. In that case, the signal is emitted in the frequency band B2 and the signal is received in the frequency band B1. The switch 632 and the duplexer 631 are also capable of setting up a relayed communication link (FIG. 6b). To that end, the duplexer 631 couples the amplifier 642 with the filter 625 and the switch 632 couples the amplifier 641 with the filter 626. In that case, the signal is emitted in the frequency band B1 and the signal is received in the frequency band B2.

The architecture in FIGS. 6a and 6b allows the use of two switches 613 and 632 instead of three switches 513, 531, 532 as illustrated in FIGS. 5a and 5b. The resulting insulation of the switches 613 and 632 makes it possible to improve the insulation between the signal emission circuit and the signal emission circuit. As an alternative, the reception circuit switch 632 is a low-power switch. The antenna switch 613 has high power strength. Insertion losses are minimised and are similar to those with the device in FIGS. 3a and 3b and the added components are passive.

In a third alternative derived from the architecture in FIGS. 6a and 6b, the switch module 730 comprises a switch 732 and a circulator or duplexer 731. However, the transmitter module 710 has two switches 713 and 714 capable of coupling either the antenna 711 or the antenna 712 or the two antennas 711 and 712 or neither of the antennas with the filter module 720.

In a first operating mode of this third alternative illustrated in FIG. 7a, the switches 713, 714, 732 and the duplexer 731 are capable of setting up a direct communication link at the antenna 712. To that end, the duplexer 731 couples the amplifier 742 with the filter 724 and the switch 732 couples the amplifier 741 with the filter 723. In that case, the signal is emitted in the frequency band B2 and the signal is received in the frequency band B1.

In a second operating mode of this third alternative illustrated in FIG. 7b, the switches 713, 714, 732 and the duplexer 731 are also capable of setting up a direct communication link at the antenna 711. To that end, the duplexer 731 couples the amplifier 742 with the filter 724 and the switch 732 couples the amplifier 741 with the filter 723. In that case, the signal is emitted in the frequency band B2 and the signal is received in the frequency band B1.

In a third operating mode of this third alternative illustrated in FIG. 7c, the switches 713, 714, 732 and the duplexer 731 are capable of setting up a relayed communication link at the antenna 712. To that end, the duplexer 731 couples the amplifier 742 with the filter 725 and the switch 732 couples the amplifier 741 with the filter 726. In that case, the signal is emitted in the frequency band B1 and the signal is received in the frequency band B2.

In a fourth operating mode of this third alternative illustrated in FIG. 7d, the switches 713, 714, 732 and the duplexer 731 are capable of setting up a self-test mode. That self-test mode makes it possible to fully test the emission/reception equipment on board the UAV, such as the antennas 711, 712, the front end 700 and the modem 750. In the case of FIG. 7d, the self-test mode is carried out on the frequency band B1. To that end, the switch 713 couples the antenna 711 with the duplexer 727 and the switch 714 couples the antenna 712 with the duplexer 728. Further, the duplexer 731 couples the amplifier 742 with the filter 725 and the switch 732 couples the amplifier 741 with the filter 723.

In a fifth operating mode of this third alternative illustrated in FIG. 7e, the switches 713, 714, 732 and the duplexer 731 are capable of setting up a self-test mode. In the case of FIG. 7e, the self-test mode is carried out on the frequency band B2. To that end, the switch 713 couples the antenna 711 with the duplexer 727 and the switch 714 couples the antenna 712 with the duplexer 728. Further, the duplexer 731 couples the amplifier 742 with the filter 724 and the switch 732 couples the amplifier 741 with the filter 726.

The architecture in FIGS. 7a to 7e allows the addition of a power switch 714 compared to the architecture illustrated in FIGS. 6a and 6b. In particular, it makes it possible to use a particularity of the direct communication links for the UAV. That is because an antenna system is generally made up of a high-gain antenna, called a pointed directional antenna, and a low-gain antenna called an omnidirectional antenna, or a fixed antenna. For its part, the relayed mode only uses the directional antenna. In this embodiment of the invention, the coupling between the antenna 711 and 712 is smaller than the insulation of the switches 713, 714 of the antennas 711, 712. The signal from the emission circuit is also improved when the front end 700 is in relayed mode.

In a fourth alternative derived from the architecture in FIGS. 7a to 7e, the switch module 830 comprises a switch 832 and a circulator or duplexer 831. The duplexer 831 is configured to be able to couple the power amplifier 842 with either a filter 824 in the frequency band B2, as illustrated in FIG. 8, or a filter 825 (not illustrated). The switch 832 is configured to be able to couple either an LNA 841a or an LNA 841b. The amplifier 841a is connected with the filter 823 and the amplifier 841b is connected with the filter 826.

This architecture according to FIG. 8 makes it possible to increase the insulation between emission and transmission compared to the different embodiments and their alternatives presented above. That is made possible through the use of two LNAs 841a and 841b. That is because the improved insulation between the emission circuit and the reception circuit is obtained by removing the power supply of the LNA located in the unused reception channel. The consequences of such a use of two amplifiers 841a and 841b are firstly the fact that the gain of the LNA is annihilated and secondly that the insulation between the input and output of an amplifier that is not live is several tens of decibels. Further, as the switch 832 of the LNA 841a, 841b is placed at the output of the device of the front end 800, the overall noise factor of the receiver is minimised compared to the different architectures illustrated in FIGS. 1 to 7e.

The invention claimed is:

1. A full duplex microwave front end for the communication system of an unmanned aerial vehicle, comprising:
   a transmitter module capable of selecting an antenna of a plurality of antennas that is most appropriate at a given time to emit a modulated signal or receive a reception signal, or both to emit the modulated signal and receive the reception signal;

a filter module, capable of insulating an emission function from a reception function in order to emit the modulated signal or insulating the reception function from the emission function in order to receive the reception signal;

an amplifier module, capable of amplifying the reception signal received in order to demodulate it, and capable of amplifying a power of the modulated signal intended to be emitted, and a switch module, wherein the filter module comprises at least one first filter that insulates the reception signal on a first frequency band and at least one second filter that insulates the modulated signal on a second frequency band when the front-end is in a direct communication link mode, wherein said first filter insulates the modulated signal on the first frequency band and said second filter insulates the reception signal on the second frequency band when the front-end is in a relayed communication link mode, wherein the switch module is capable of switching the first and second frequency bands used for the reception function and the emission function, respectively, when switching from the direct communication link mode to the relayed communication link mode.

2. A front end according to claim 1, wherein the amplifier module comprises at least a first amplifier capable of amplifying the reception signal received so as to be demodulated by a modem, and a second amplifier capable of amplifying the power of the modulated signal modulated by said modem so as to be emitted.

3. A front end according to claim 1, wherein the transmitter module comprises at least one switch, configured to select the antenna which is the most appropriate at a given time.

4. A front end according to claim 2, wherein said first and second filters of the filter module are connected to the transmitter module by means of a duplexer and connected to the amplifier module by means of the switch module.

5. A front end according to claim 2, wherein the switch module comprises at least one switch configured:
to couple said first amplifier with said first filter and said second amplifier with said second filter when the front end is in said direct communication link mode, and
to couple said first amplifier with said second filter and said second amplifier with said first filter when the front end is in said relayed communication link mode.

6. A front end according to claim 5, wherein the switch module comprises four switches configured so that said switches are capable of switching together synchronously.

7. A front end according to claim 2, wherein the filter module has first and second branches each comprising one first filter and one second filter,
the first and second filters of each branch being each connected to the transmitter module by means of a duplexer and also connected to the amplifier module by means of the switch module.

8. A front end according to claim 7, wherein the switch module comprises two switches configured:
to couple said first amplifier with said first filter of the first branch and said second amplifier with said second filter of the first branch when the front end is in said direct communication link mode, and
to couple said first amplifier with said second filter of the second branch and said second amplifier with said first filter of the second branch when the front end is in said relayed communication link mode.

9. A front end according to claim 7, wherein the switch module comprises a duplexer and a switch configured:
to couple said first amplifier with said first filter of the first branch and said second amplifier with said second filter of the first branch when the front end is in said direct communication link mode, and
to couple said first amplifier with said second filter of the second branch and said second amplifier with said first filter of the second branch when the front end is in said relayed communication link mode.

10. A front end according to claim 9, wherein the transmitter module comprises two switches capable of selecting two antennas at the same time, so that:
when the second amplifier is coupled with said first filter of the second branch and the first amplifier is coupled with said first filter of the first branch, the front end is configured to be in a self-test mode in the first frequency band, and
when the first amplifier is coupled with said second filter of the second branch and the second amplifier is coupled with said second filter of the first branch, the front end is configured to be in a self-test mode in the second frequency band.

11. A front end according to claim 9, wherein the switch module is configured to be able to couple the modem with:
either one of said first amplifier connected to said first filter insulating the reception circuit on the first frequency band in the first branch, or
another of said first amplifier connected to said second filter insulating the reception circuit on the second frequency band in the second branch.

12. A front end according to claim 5, wherein the first and second filters of the filter module are connected to the transmitter module by means of a duplexer and connected to the amplifier module by means of the switch module.

13. A front end according to claim 5, wherein the transmitter module comprises at least one switch, configured to select the antenna which is the most appropriate at a given time.

14. A front end according to claim 10, wherein the switch module is configured to be able to couple the modem with:
either one of said first amplifier connected to said first filter insulating the reception circuit on the first frequency band in the first branch, or
another of said first amplifier connected to said second filter insulating the reception circuit on the second frequency band in the second branch.

15. A front end according to claim 10, wherein the transmitter module comprises two switches capable of coupling either one of said antennas or another one of said antennas or two antennas or neither of the two antennas with the filter module.

16. A front end according to claim 14, wherein the transmitter module comprises two switches capable of coupling either one of said antennas or another one of said antennas or two antennas or neither of the two antennas with the filter module.

* * * * *